US012711075B2

(12) United States Patent
La Fratta

(10) Patent No.: US 12,711,075 B2
(45) Date of Patent: Aug. 18, 2026

(54) SYSTEMS, METHODS, AND APPARATUS FOR INTERFERENCE AVOIDANCE IN MEMORY SYSTEMS

(71) Applicant: Samsung Electronics Co., Ltd., Suwon-si (KR)

(72) Inventor: Patrick Anthony La Fratta, McKinney, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/420,741

(22) Filed: Jan. 23, 2024

(65) Prior Publication Data

US 2025/0028647 A1 Jan. 23, 2025

Related U.S. Application Data

(60) Provisional application No. 63/515,086, filed on Jul. 21, 2023.

(51) Int. Cl.
*G06F 12/1009* (2016.01)
*G06F 12/0831* (2016.01)

(52) U.S. Cl.
CPC ...... *G06F 12/1009* (2013.01); *G06F 12/0831* (2013.01)

(58) Field of Classification Search
CPC ............ G06F 12/1009; G06F 12/0831; G06F 12/0607; G06F 3/0604; G06F 3/0614; G06F 2212/7201
See application file for complete search history.

(56) References Cited

U.S. PATENT DOCUMENTS 6,584,528 B1 * 6/2003 Kurafuji ............ G06F 13/4022 370/386
10,037,150 B2 7/2018 Magro et al.
(Continued)

OTHER PUBLICATIONS

Oh, B., Kim, N. S., Ahn, J., Li, B., Dreslinski, R. G., & Mudge, T. (2018). A load balancing technique for memory channels. Proceedings of the International Symposium on Memory Systems, p. 55-66. https://doi.org/10.1145/3240302.3240306 (Year: 2018).*
(Continued)

*Primary Examiner* — Reginald G Bragdon
*Assistant Examiner* — Zakaria Mohammed Belkhayat
(74) *Attorney, Agent, or Firm* — Renaissance IP Law Group LLP

(57) ABSTRACT

A method may include allocating a first memory page from a first portion of an address space based on a first access pattern for the first memory page, and allocating a second memory page from a second portion of the address space based on a second access pattern for the second memory page. The first portion of the address space may be configured for an interleaving operation. The second portion of the address space may be configured for a partitioned operation. The first memory page may be allocated based on an access pattern indication. The first memory page may be allocated based on a request received from a user, and the access pattern indication may be received from the user. The first portion of the address space may be mapped to a first pseudo-channel, and the second portion of the address space may be mapped to a second pseudo-channel.

15 Claims, 10 Drawing Sheets

(56) References Cited

U.S. PATENT DOCUMENTS

| | | | | |
|---|---|---|---|---|
| 11,080,253 | B1 * | 8/2021 | Leshinsky | G06F 16/2272 |
| 2008/0172543 | A1 | 7/2008 | Ben-Yehuda et al. | |
| 2014/0208060 | A1 * | 7/2014 | Walker | G06F 13/1684 711/206 |
| 2017/0109090 | A1 * | 4/2017 | Chun | G06F 3/0625 |
| 2017/0132044 | A1 * | 5/2017 | Kaneko | G06F 3/0631 |
| 2019/0095329 | A1 | 3/2019 | Kumar et al. | |
| 2022/0122686 | A1 | 4/2022 | Burg et al. | |
| 2022/0374692 | A1 | 11/2022 | Rajamani et al. | |
| 2023/0062540 | A1 | 3/2023 | Surti et al. | |
| 2024/0394141 | A1 * | 11/2024 | Rajamani | G06F 12/0292 |

OTHER PUBLICATIONS

"High Bandwidth Memory (HBM3)", Lumenci Team, Jul. 15, 2022 (Year: 2022).*

Anonymous, "HBM2 Deep Dive," Monitor Insider, Jan. 2017, retrieved from http://monitorinsider.com/HBM.html, 9 pages.

European Extended Search Report for Application No. 24187656.4, mailed Dec. 18, 2024.

Hillenbrand, Marius et al., "Multiple Physical Mappings: Dynamic DRAM Channel Sharing and Partitioning," APSys '17, 2017; 9 pages, Sep. 2017.

Liu, Lei et al., "BPM/BPM+: Software-Based Dynamic Memory Partitioning Mechanisms for Mitigating DRAM Bank-/Channel-Level Interferences in Multicore Systems," ACM Transactions on Architecture and Code Optimization, vol. 11, No. 1, Article 5, 28 pages, Feb. 2014.

Lugo, Tamara et al., "A Survey of Techniques for Reducing Interference in Real-Time Applications on Multicore Platforms," IEEE Access, vol. 10, pp. 21853-21882, Feb. 2022.

Muralidhara, Sai Prashanth et al., "Reducing Memory Interference in Multicore Systems via Application-Aware Memory Channel Partitioning," MICRO '11, 12 pages, Dec. 2011.

* cited by examiner

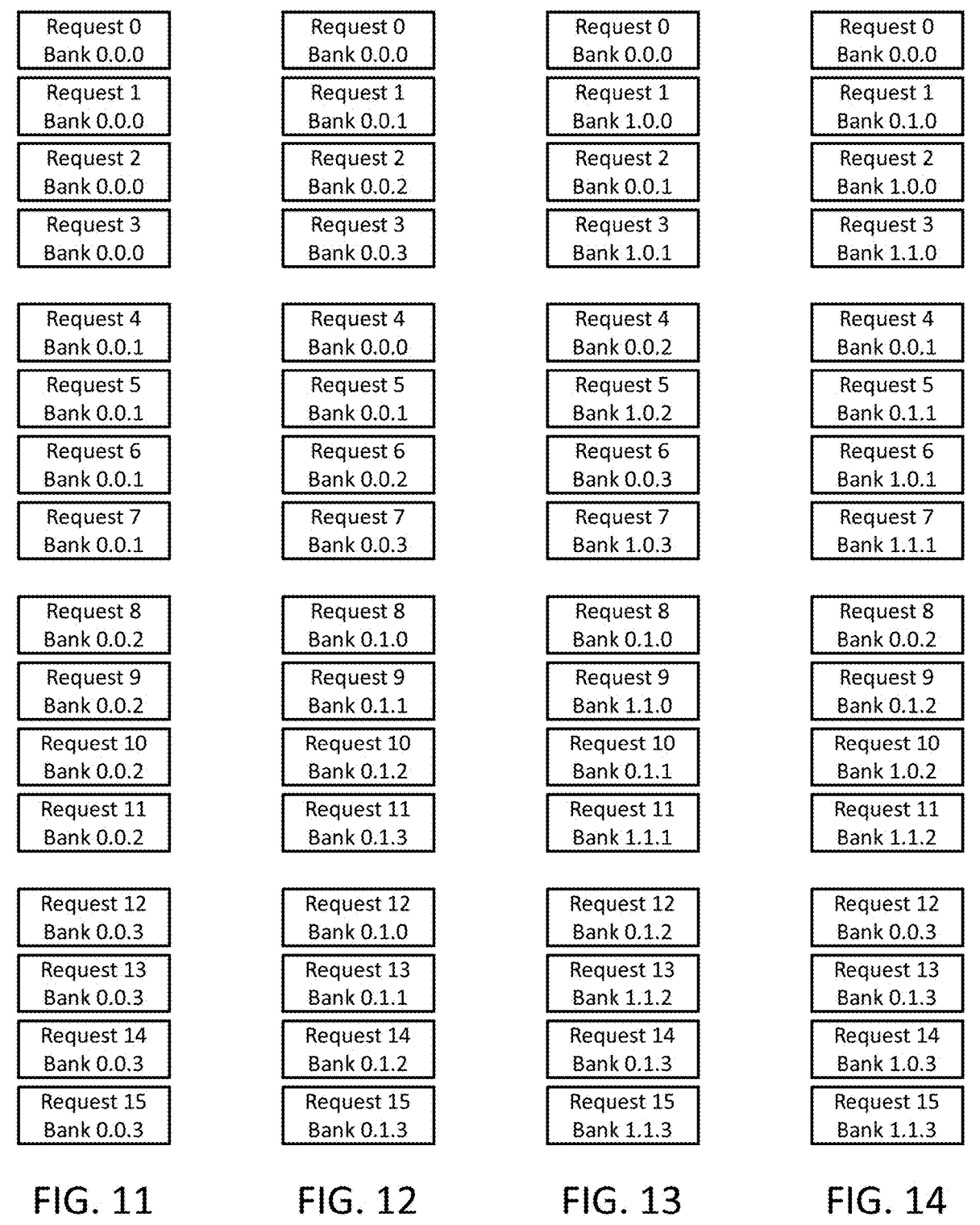

| Request | Bank |
|---|---|
| Request 0 | Bank 0.0.0 |
| Request 1 | Bank 0.0.0 |
| Request 2 | Bank 0.0.0 |
| Request 3 | Bank 0.0.0 |
| Request 4 | Bank 0.0.1 |
| Request 5 | Bank 0.0.1 |
| Request 6 | Bank 0.0.1 |
| Request 7 | Bank 0.0.1 |
| Request 8 | Bank 0.0.2 |
| Request 9 | Bank 0.0.2 |
| Request 10 | Bank 0.0.2 |
| Request 11 | Bank 0.0.2 |
| Request 12 | Bank 0.0.3 |
| Request 13 | Bank 0.0.3 |
| Request 14 | Bank 0.0.3 |
| Request 15 | Bank 0.0.3 |

FIG. 11

| Request | Bank |
|---|---|
| Request 0 | Bank 0.0.0 |
| Request 1 | Bank 0.0.1 |
| Request 2 | Bank 0.0.2 |
| Request 3 | Bank 0.0.3 |
| Request 4 | Bank 0.0.0 |
| Request 5 | Bank 0.0.1 |
| Request 6 | Bank 0.0.2 |
| Request 7 | Bank 0.0.3 |
| Request 8 | Bank 0.1.0 |
| Request 9 | Bank 0.1.1 |
| Request 10 | Bank 0.1.2 |
| Request 11 | Bank 0.1.3 |
| Request 12 | Bank 0.1.0 |
| Request 13 | Bank 0.1.1 |
| Request 14 | Bank 0.1.2 |
| Request 15 | Bank 0.1.3 |

FIG. 12

| Request | Bank |
|---|---|
| Request 0 | Bank 0.0.0 |
| Request 1 | Bank 1.0.0 |
| Request 2 | Bank 0.0.1 |
| Request 3 | Bank 1.0.1 |
| Request 4 | Bank 0.0.2 |
| Request 5 | Bank 1.0.2 |
| Request 6 | Bank 0.0.3 |
| Request 7 | Bank 1.0.3 |
| Request 8 | Bank 0.1.0 |
| Request 9 | Bank 1.1.0 |
| Request 10 | Bank 0.1.1 |
| Request 11 | Bank 1.1.1 |
| Request 12 | Bank 0.1.2 |
| Request 13 | Bank 1.1.2 |
| Request 14 | Bank 0.1.3 |
| Request 15 | Bank 1.1.3 |

FIG. 13

| Request | Bank |
|---|---|
| Request 0 | Bank 0.0.0 |
| Request 1 | Bank 0.1.0 |
| Request 2 | Bank 1.0.0 |
| Request 3 | Bank 1.1.0 |
| Request 4 | Bank 0.0.1 |
| Request 5 | Bank 0.1.1 |
| Request 6 | Bank 1.0.1 |
| Request 7 | Bank 1.1.1 |
| Request 8 | Bank 0.0.2 |
| Request 9 | Bank 0.1.2 |
| Request 10 | Bank 1.0.2 |
| Request 11 | Bank 1.1.2 |
| Request 12 | Bank 0.0.3 |
| Request 13 | Bank 0.1.3 |
| Request 14 | Bank 1.0.3 |
| Request 15 | Bank 1.1.3 |

FIG. 14

SYSTEMS, METHODS, AND APPARATUS FOR INTERFERENCE AVOIDANCE IN MEMORY SYSTEMS

CROSS-REFERENCE TO RELATED APPLICATION

This application claims priority to, and the benefit of, U.S. Provisional Patent Application Ser. No. 63/515,086 filed Jul. 21, 2023 which is incorporated by reference.

TECHNICAL FIELD

This disclosure relates generally to memory systems, and more specifically to systems, methods, and apparatus for interference avoidance in memory systems.

BACKGROUND

A virtual memory system may use a memory mapping scheme to map virtual memory addresses to physical memory addresses in a physical memory system. A physical memory system may include one or more memory channel controllers to provide access to memory devices that may be arranged in banks, channels, ranks, and/or the like. In some physical memory systems, a channel may be implemented with two or more pseudo-channels that may share resources such as a command and/or address bus.

The above information disclosed in this Background section is only for enhancement of understanding of the background of the inventive principles and therefore it may contain information that does not constitute prior art.

SUMMARY

A method may include allocating a first memory page from a first portion of an address space based on a first access pattern for the first memory page, and allocating a second memory page from a second portion of the address space based on a second access pattern for the second memory page. The first portion of the address space may be configured for an interleaving operation. The second portion of the address space may be configured for a partitioned operation. The first memory page may be allocated based on an access pattern indication. The first memory page may be allocated based on a request received from a user, and the access pattern indication may be received from the user. The first portion of the address space may be mapped to a first pseudo-channel, and the second portion of the address space may be mapped to a second pseudo-channel. The first pseudo-channel may use a command bus, and the second pseudo-channel may use the command bus. The first portion of the address space may be mapped to a third pseudo-channel, and the first pseudo-channel and the third pseudo-channel may be configured for an interleaving operation. The interleaving operation may include channel interleaving. The interleaving operation may include bank interleaving. The method may further include monitoring an access of the first memory page, detecting, based on the monitoring, interference associated with the first memory page, and allocating, based on the detecting, a third memory page. The third memory page may be allocated from a portion of the address space configured for an interleaving operation. The first memory page may be allocated from a first block of memory associated with a first channel, and the third memory page may be allocated from a second block of memory associated with a second channel. The interference may include command bus contention.

A method may include allocating a first memory page using a first memory mapping scheme, detecting interference associated with the first memory page, and allocating, based on the interference, a second memory page using a second memory mapping scheme. The first memory mapping scheme may include a partitioned memory mapping scheme, and the second memory mapping scheme may include an interleaved memory mapping scheme. The first memory page may be allocated from a first portion of an address space mapped to a first pseudo-channel, and the interference may include bus contention between the first pseudo-channel and a second pseudo-channel.

A memory system may include at least one processing circuit configured to allocate a first memory page from a first portion of an address space based on a first access pattern for the first memory page, and allocate a second memory page from a second portion of the address space based on a second access pattern for the second memory page. The at least one processing circuit may be configured to receive an access pattern indication, and allocate the first memory page based on the access pattern indication. The at least one processing circuit may be configured to allocate the first memory page using a first memory mapping scheme, the memory system may further include a monitoring circuit configured to detect interference associated with the first memory page, and the at least one processing circuit may be configured to allocate, based on the interference, a third memory page using a second memory mapping scheme.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 11 illustrates an embodiment of a partitioned memory allocation sequence in accordance with the disclosure.

FIG. 12 illustrates an embodiment of a memory allocation sequence with bank interleaving within a memory subspace in accordance with the disclosure.

FIG. 13 illustrates an embodiment of a memory allocation sequence with bank and channel interleaving within a memory subspace in accordance with the disclosure.

FIG. 14 illustrates an embodiment of a memory allocation sequence with bank, channel, and pseudo-channel interleaving in accordance with the disclosure.

DETAILED DESCRIPTION

Figure 1:
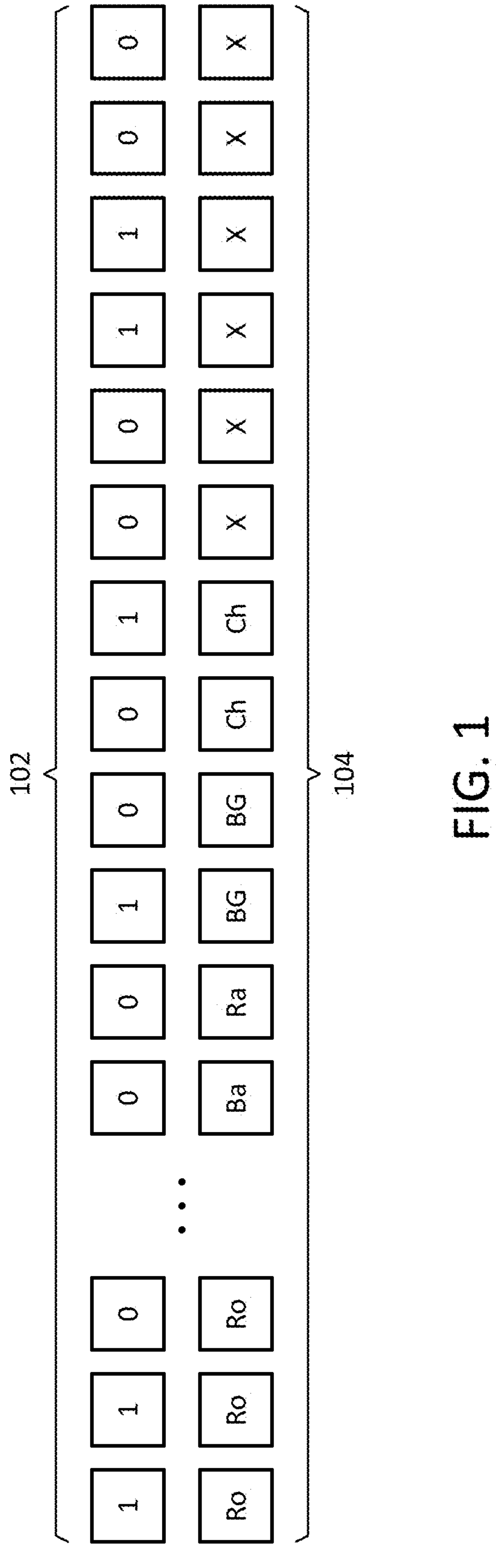
FIG. 1 illustrates an embodiment of an interleaved memory address mapping scheme.

Some memory systems implement interleaving schemes that may interleave memory accesses across memory resources such as channels, ranks, banks, and/or the like. Depending on the implementation details, interleaving may improve performance, for example, by increasing utilization of memory resources, especially for traffic streams that are highly sequential (e.g., perform consecutive access from a localized memory resource such as a row buffer).

Some memory traffic streams, however, may be less sequential or even random. Depending on the implementation details, less sequential traffic streams may cause interference in interleaved access schemes. For example, using interleaved access with multiprogrammed and/or multi-threaded workloads may cause interference that may reduce performance by reducing row buffer hit rates.

Some memory systems may implement partitioning schemes that may reduce interference by isolating less sequential traffic streams to non-interleaved memory partitions. Partitioning schemes, however, may not allow interleaving in situations in which interleaving may be beneficial. Some memory systems may implement access schemes that may combine partitioned and interleaved access schemes, for example, using mapping aliases. These combined access schemes, however, may not be applied to some memory interfaces in which memory resources may have shared data paths and/or other features (e.g., pseudo-channels that may have separate data buses but share a command and/or address (C/A) bus).

Some memory systems in accordance with the disclosure may implement a partitioning scheme in which a first portion of an address space (e.g., a first subspace including a first group of first pseudo-channels) may be used for traffic streams having a first access pattern, and a second portion of the address space (e.g., a second subspace including a second group of second pseudo-channels) may be used for traffic streams having a second access pattern.

A first access pattern may refer to a sequential access pattern, a non-sequential access pattern (e.g., a random access pattern), or the like. A second access pattern may refer to a sequential access pattern, a non-sequential access pattern (e.g., a random access pattern), or the like. A second access pattern may typically, but not necessarily, be different than a first access pattern. For example, in one exemplary embodiment of a memory system, a first portion of an address space may initially be configured for use with sequential traffic streams, and a second portion of the address space may initially be configured for use with non-sequential traffic streams. The memory system, however, may only receive traffic streams having sequential access patterns until the first portion of the address space may be completely allocated to capacity. Thus, the memory system may reconfigure at least some of the second portion of the memory space for use with sequential traffic streams. Nonetheless, the system may still be capable of allocating at least some of the second portion of the memory space, or a third portion of the memory space, for use with non-sequential traffic streams.

In some implementations of the exemplary embodiment described above, the first portion of the address space may be implemented with a first address subspace that may include even pseudo-channels with interleaving enabled across some or all of the even pseudo-channels, and the second portion of the address space may be implemented with a second address subspace that may include odd pseudo-channels that may, at least initially, have interleaving disabled. In some implementations, one or more (e.g., each) of the first pseudo-channels may share a C/A bus with corresponding one or more (e.g., each) of the second pseudo-channels.

In some embodiments, a memory system may be provided with an indication of an access pattern for a page of memory to be allocated from the address space. For example, a user such as an application, service, process, operating system, compiler, runtime environment, interpreter, and/or the like, may provide an indication (e.g., by setting or clearing a flag) that a page of memory is likely to be accessed more sequentially or less sequentially. The memory system may use the indication to allocate a page that is likely to be accessed more sequentially from a first portion of an address space (e.g., a first group of pseudo-channels with interleaving enabled). Additionally or alternatively, the memory system may use the indication to allocate a page that is likely to be accessed less sequentially from a second portion of the address space (e.g., a second group of pseudo-channels with interleaving initially disabled).

Additionally or alternatively, some memory systems in accordance with the disclosure may implement a monitoring and/or adjustment scheme that may determine interference in a memory system and/or adjust an allocation scheme, interleaving scheme, and/or the like, based on the interference. For example, a memory system may track pseudo-channel contention in a portion of an address space (e.g., a group of pseudo-channels with interleaving initially disabled) from which pages may be allocated for less sequential traffic streams. If the pseudo-channel contention exceeds a threshold, the memory system may enable interleaving in the group of pseudo-channels. Additionally, or alternatively, if the pseudo-channel contention exceeds a threshold, the memory system may allocate pages for less sequential traffic streams from a different channel.

This disclosure encompasses numerous aspects relating to memory systems. The aspects disclosed herein may have independent utility and may be embodied individually, and not every embodiment may utilize every aspect. Moreover, the aspects may also be embodied in various combinations, some of which may amplify some benefits of the individual aspects in a synergistic manner.

For purposes of illustration, some embodiments may be described in the context of some specific implementation details such as memory devices implemented with dynamic random access memory (DRAM) having specific numbers of ranks, channels, pseudo-channels, banks, and/or the like.

However, the aspects of the disclosure are not limited to these or any other implementation details.

In some embodiments, a memory page may refer to any unit of memory allocation, for example, a page, cache line, block, region, and/or the like.

FIG. 1 illustrates an embodiment of an interleaved memory address mapping scheme. The pattern of bits 102 at the top of FIG. 1 represents a physical address that a user of a memory system may send to a memory controller to access the physical memory location. The pattern of bit indicators 104 at the bottom of FIG. 1 represents a mapping that the memory controller may use to map the physical address 102 to one or more rows, ranks, banks, bank groups, channels, offsets, and/or the like, of physical memory devices.

In the pattern 104, Ro indicates a row address bit, Ra indicates a rank address bit, Ba indicates a bank address bit, BG indicates a bank group address bit, Ch indicates a channel address bit, and X indicates an offset, for example, within a burst. The relative positions of bit the indicators 104 may determine the order, type, and/or the like, of interleaving. For example, if the bank bits Ba are located closer to the least significant bit (LSB) side of an address than the Channel bits Ch, the mapping may alternate between banks more frequently than it alternates between channels.

An interleaved memory address mapping scheme such as that illustrated in FIG. 1 may provide a relatively high level of performance when used for traffic streams (e.g., sequences of memory accesses) with relatively sequential access patterns (which may also be referred to as access patterns having a relatively high level of sequentially, regularity, locality, and/or localization). Depending on the implementation details, a sequential access pattern may improve performance (e.g., bandwidth, average read latency, and/or the like), for example, by increasing utilization of memory resources (e.g., channels, banks, and/or the like) and/or row buffer hit rates.

In some embodiments, a sequential access pattern may refer to an access pattern in which consecutive memory access requests may access consecutive, or nearly consecutive physical memory addresses. Additionally, or alternatively, in some embodiments, a sequential access pattern may refer to an access pattern in which consecutive memory access requests may access memory addresses in an order that may provide a performance benefit for an underlying memory configuration. For example, in some embodiments, an access pattern that may consecutively access multiple columns within a row (and thus only involve a single row command, precharge, and/or the like), regardless of the exact order of the column accesses, may be referred to as a sequential access pattern (or an access pattern with a high level of locality).

Some memory workloads, however, may access physical memory using traffic streams that may be less sequential or non-sequential (e.g., may have less locality or may even be random). Depending on the implementation details, less sequential traffic streams may cause interference that may reduce performance in interleaved access schemes. For example, variegated workloads such as multiprocess and/or multithreaded workloads may compete for memory resources (e.g., may cause contention) that may exacerbate the irregularity of memory access requests received by a memory controller. Thus, using interleaving for multiprogrammed and/or multithreaded workloads may cause interference that may reduce performance, for example, by reducing row buffer hit rates.

In some embodiments, interference caused by the use of interleaving may be reduced or eliminated by isolating less sequential traffic streams to non-interleaved memory partitions. For example, traffic streams from different processes, threads, and/or the like, may be isolated to address subspaces that may be partitioned at a bank level or a channel level using techniques such as a bank-level partitioning mechanism or application-aware memory channel partitioning. These partitioning schemes, however, may not allow interleaving in situations in which interleaving may be beneficial.

Some memory systems may combine partitioned and interleaved access schemes to reduce interference caused by the use of interleaving with less sequential traffic streams while still enabling interleaving for traffic streams that may benefit from interleaving. Such a memory system may overlay multiple virtual regions over a physical address space, wherein each virtual region may be configured for partitioning or interleaving.

Figure 2:
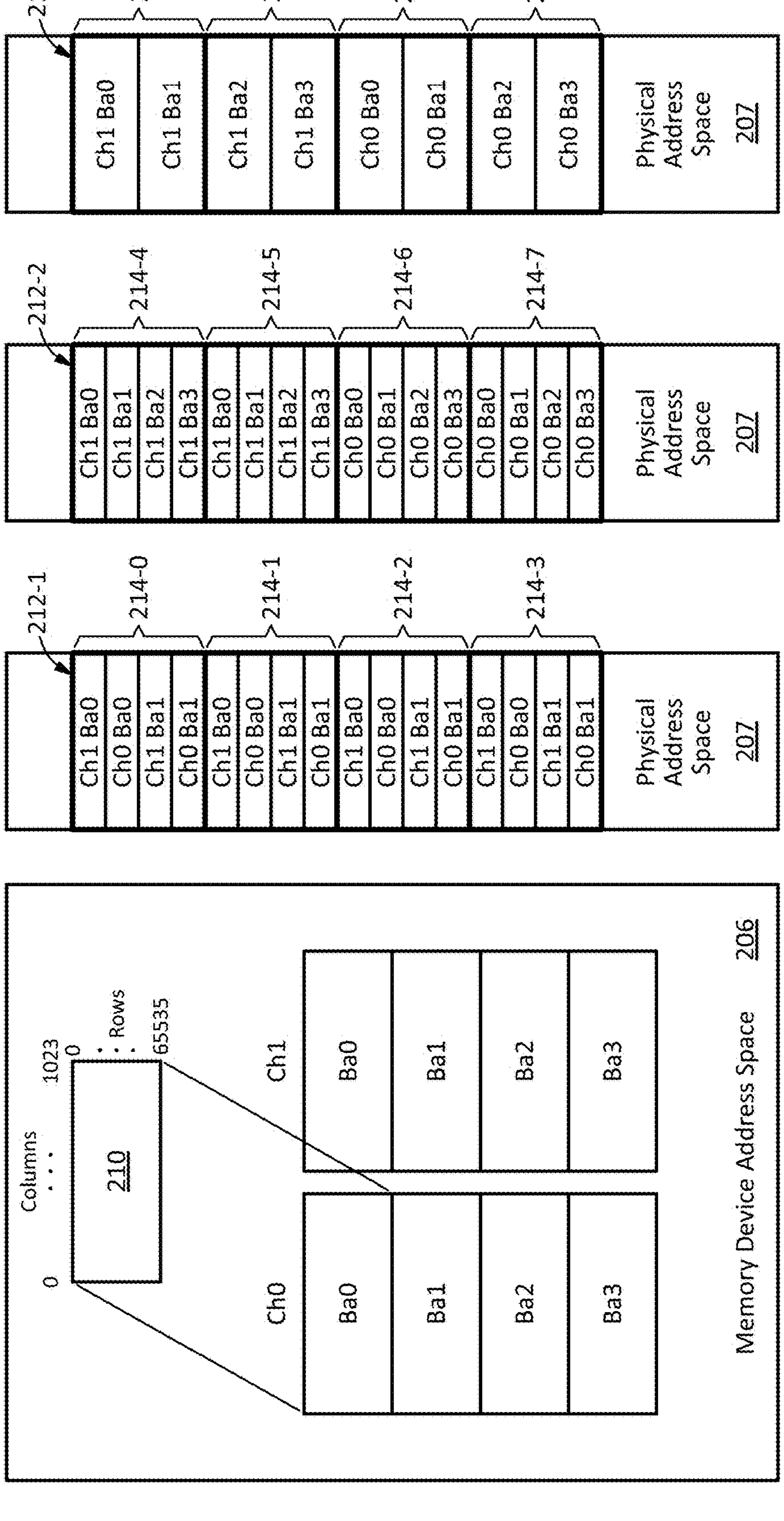
FIG. 2 illustrates an embodiment of a memory address mapping scheme with combined partitioning and interleaving.

FIG. 2 illustrates an embodiment of a memory address mapping scheme with combined partitioning and interleaving. The embodiment illustrated in FIG. 2 includes a memory device address space (e.g., a DRAM address space) 206 that may include memory devices arranged to be accessed using two channels Ch0 and Ch1, each channel accessing four banks Ba0, Ba1, Ba2, and Ba3 of memory devices, but any number of channels, banks, and/or the like, may be used. In some embodiments, some or all of the memory address space 206 may be implemented with memory modules that may include one or more ranks of memory devices. For purposes of illustration, each bank may have memory cells arranged in 1K columns and 64K rows as shown in representative bank 210, but banks may be arranged in any number of columns, rows, and/or the like.

Multiple virtual memory regions, which may be referred to as memory device mapping aliases 212-1, 212-2, and 212-3, may be implemented by configuring a target address decoder (TAD) to overlay the virtual regions over a physical address space 207. Each virtual memory region may be configured to allocate pages with (1) both channel and bank interleaving enabled, (2) bank interleaving enabled but channels partitioned, or (3) interleaving disabled (banks and channels partitioned). The partitioning or interleaving scheme may be selected at run-time (e.g., by an operating system), and the memory system may ensure that only one alias is allowed to use each block of physical memory.

Mapping alias 212-1 illustrates four page frames 214-0, 214-1, 214-2, and 214-3 with both channel and bank interleaving enabled. The channel and bank identifiers in each of the four rows within each page frame indicate interleaving between the two channels Ch0 and Ch1 and the four banks Ba0, Ba1, Ba2, and Ba3.

Mapping alias 212-2 illustrates four page frames 214-4, 214-5, 214-6, and 214-7 with bank interleaving enabled but channel interleaving disabled (e.g., channels partitioned). The channel and bank identifiers in each of the four rows within each page frame indicate interleaving between the four banks Ba0, Ba1, Ba2, and Ba3.

Mapping alias 212-3 illustrates four page frames 214-8, 214-9, 214-10, and 214-11 with both channel and bank interleaving disabled (e.g, banks and channels partitioned). The channel and bank identifiers in each of the two sets of rows within each page frame indicate the corresponding channels Ch0 and Ch1 and banks Ba0, Ba1, Ba2, and Ba3.

Figure 3:
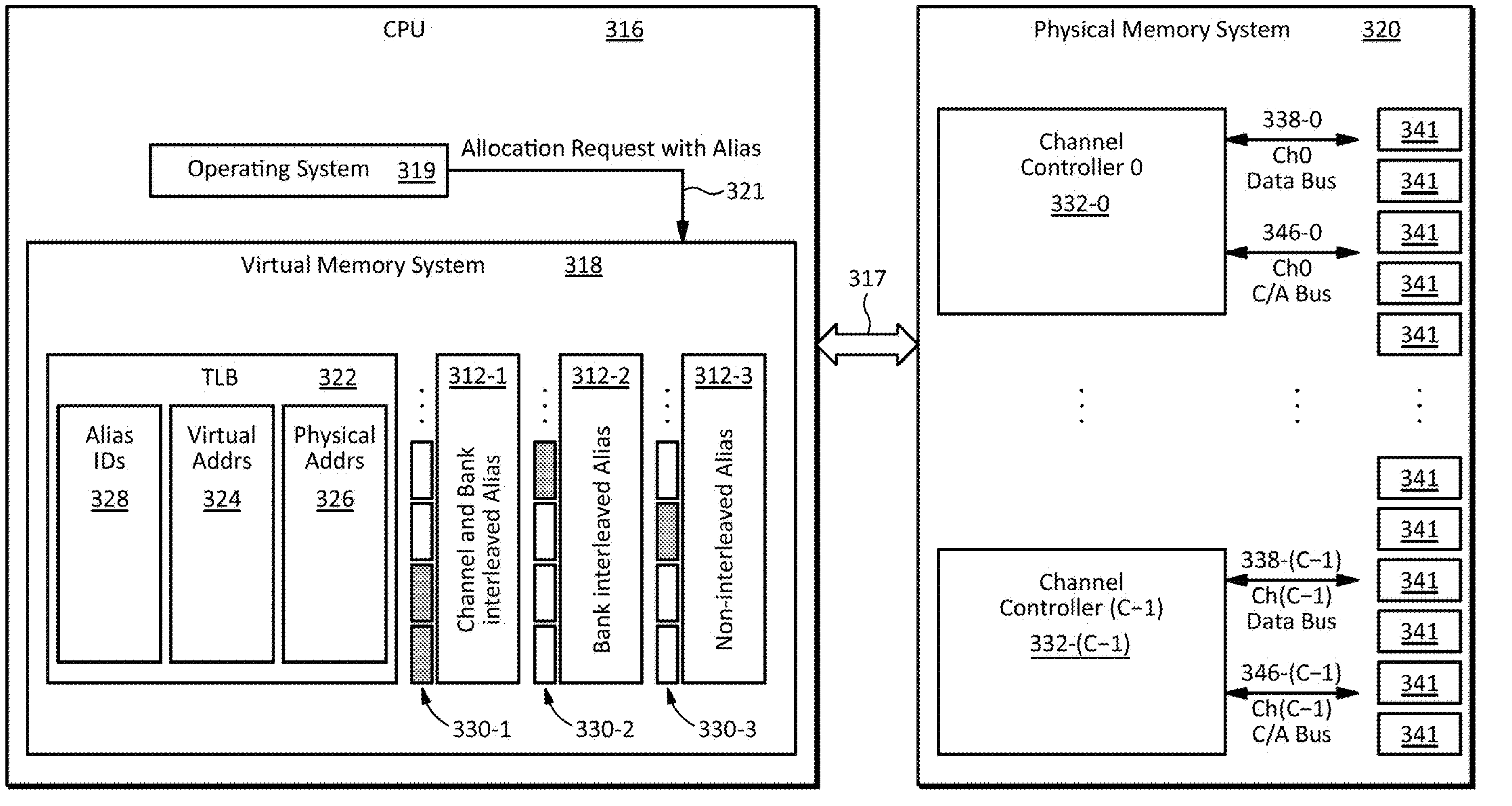
FIG. 3 illustrates an embodiment of a memory system with combined partitioning and interleaving.

FIG. 3 illustrates an embodiment of a memory system with combined partitioning and interleaving. The embodiment illustrated in FIG. 3 may be used, for example, to implement the scheme illustrated in FIG. 2.

Referring to FIG. 3, a central processing unit (CPU) 316 may implement a virtual memory system 318 that may allocate memory pages from a physical memory system 320. The virtual memory system 318 may include a translation lookaside buffer (TLB) 322 that may map virtual addresses 324 to physical addresses 326 using alias identifiers (IDs) 328 to implement aliases 312-1 with both channel and bank interleaving enabled, aliases 312-2 with bank interleaving enabled but channels partitioned, and aliases 312-3 interleaving disabled (e.g., banks and channels partitioned). To ensure that only one alias is allowed to use each block of physical memory, the virtual memory system 318 may maintain maps 330-1, 330-2, and 330-3 of blocks corresponding to the aliases 312-1, 312-2, and 312-3 and only enable a block of memory (indicated by shading) to be online with only one alias. The CPU 316 may run an operating system 319 that may send allocation requests 321 including alias selections to the virtual memory system 318 which may allocate one or more pages of memory from the physical memory system 320 using the TLB in response to the allocation requests 321. In some embodiments, the operating system 319 may select the partitioning or interleaving aliases at run-time.

The physical memory system 320 may include one or more channel controllers (e.g., a number "C" of channel controllers) 332-0, . . . , 332-(C−1). Each channel controller 332-0, . . . , 332-(C−1) may interface with a corresponding portion of physical memory devices 341 such as double data rate (DDR) DRAM devices of any generation (e.g., DDR3, DDR4, DDR5, etc.) using a corresponding data bus 338-0, . . . , 338-(C−1) and C/A bus 346-0, . . . , 346-(C−1).

The virtual memory system 318 and physical memory system 320 may be connected using one or more connections 317 that may implement any type of memory interface, protocol, and/or the like, such as one or more parallel buses that may be used with dual inline memory modules (DIMMs) for DDR devices, graphic DDR (GDDR) devices, fully buffered DIMMs (FBDIMMs), Open Coherent Accelerator Processor Interface (OpenCAPI), Open Memory Interface (OMI), Peripheral Component Interconnect Express (PCIe), Compute Express Link (CXL), remote direct memory access (RDMA), RDMA over converged Ethernet (RoCE), and/or the like.

Although the memory address mapping schemes illustrated in FIG. 2 and FIG. 3 may enable an operating system to select between different partitioning or interleaving schemes for each allocation request, they may not operate with memory interfaces having certain features such as shared signal paths, different operating modes, and/or other features that may be included in more advanced memory systems. For example, some memory systems such as high bandwidth memory (HBM) systems may operate in one or more modes that implement pairs of pseudo-channels that may have separate data buses but share a C/A bus. The memory address mapping schemes illustrated in FIG. 2 and FIG. 3 may not be able to avoid interference in traffic streams arising from a shared C/A bus used by I-BM pseudo-channels.

Figure 4:
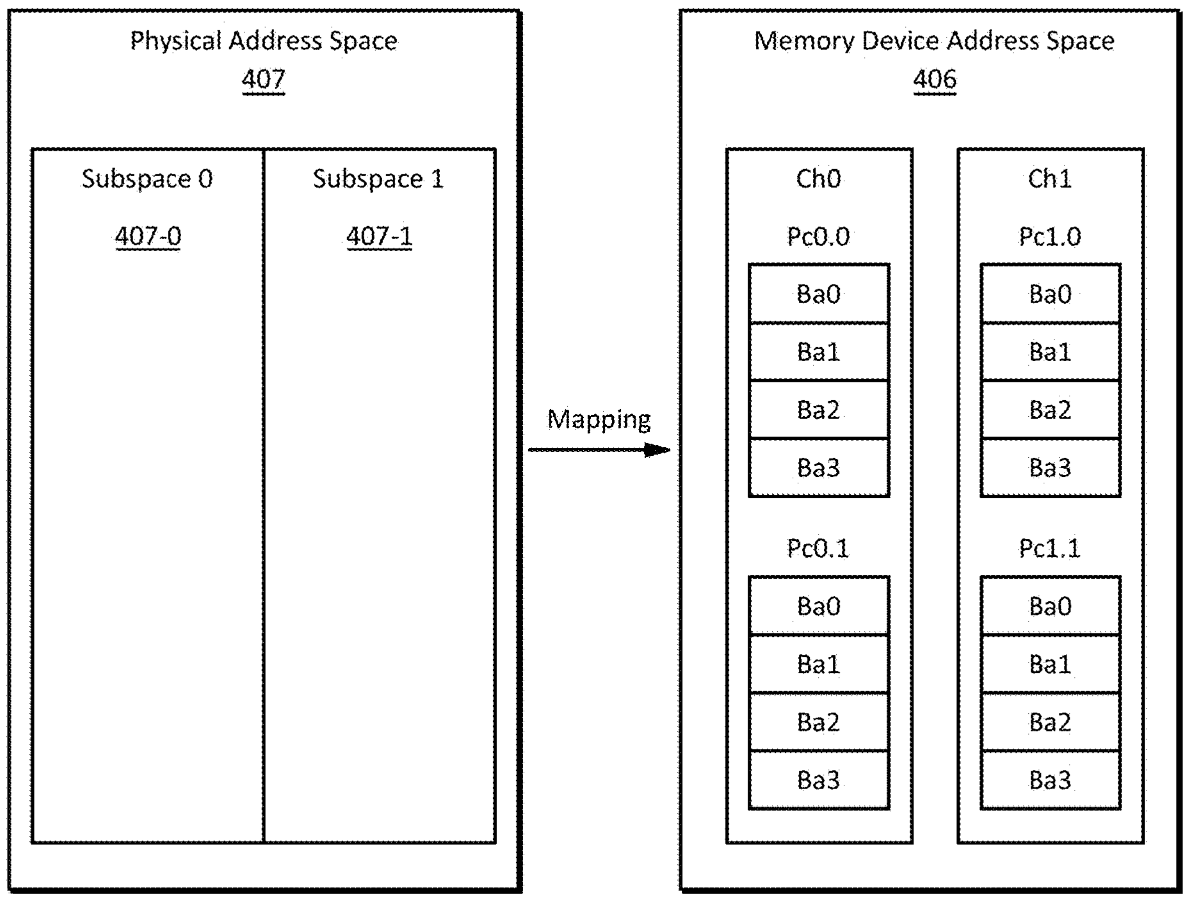
FIG. 4 illustrates an embodiment of a memory addressing scheme with address subspaces in accordance with the disclosure.

FIG. 4 illustrates an embodiment of a memory addressing scheme with address subspaces in accordance with the disclosure. The embodiment illustrated in FIG. 4 may include a physical address space 407 that may be mapped to a memory device address space (e.g., a DRAM address space) 406. For purposes of illustration, the physical address space 407 may include a first subspace 407-0 (which may also be referred to as Subspace 0) and a second subspace 407-1 (which may also be referred to as Subspace 1), but any number of subspaces may be used. In some embodiments, the address subspaces may be used for memory traffic streams with different access patterns. For example, the first subspace 407-0 may be used for more sequential traffic streams, whereas the second subspace 407-1 may be used for less sequential traffic streams.

The memory device address space 406 may include any arrangement of memory devices that may be configured to be mapped into the first subspace 407-0 and the second subspace 407-1. For purposes of illustration, the memory device address space 406 is shown with memory devices configured to be accessed as two channels Ch0 and Ch1. The first channel Ch0 may have a first pseudo-channel Pc0.0 and a second pseudo-channel Pc0.1. The second channel Ch1 may have a first pseudo-channel Pc1.0 and a second pseudo-channel Pc1.1. Each pseudo channel may have four banks Ba0, Ba1, Ba2, and Ba3, but any number of ranks, channels, banks, and/or the like, may be used.

The first pseudo-channel in each channel (e.g., Pc0.0 and/or Pc1.0) may be referred to individually and/or collectively as the first pseudo-channel Pc0, and the second pseudo-channel in each channel (e.g., Pc0.1 and/or Pc1.1) may be referred to individually and/or collectively as the second pseudo-channel Pc1. Additionally. or alternatively, the first pseudo-channel in each channel (e.g., Pc0.0 and/or Pc1.0) may be referred to individually and/or collectively as even pseudo-channels, and the second pseudo-channel in each channel (e.g., Pc0.1 and/or Pc1.1) may be referred to individually and/or collectively as odd pseudo-channels.

In some embodiments, the two pseudo-channels of each channel may be configured as a pseudo-channel pair in which each of the two pseudo-channels uses a separate data bus, but the pseudo-channel pair shares a common address and/or command bus. For example, pseudo-channel Pc0.0 may use a first data bus, pseudo-channel Pc0.1 may use a second data bus, and both of the pseudo-channels Pc0.0 and Pc0.1 may share a command and/or address bus.

One or more memory devices used to implement the memory device address space 406 may operate in one or more modes. For example, in some embodiments, an HBM device may operate in a pseudo-channel mode in which each pseudo-channel may use a separate 16-bit wide data bus. The HBM device may also operate in a legacy mode in which the two 16-bit wide data buses may be configured to operate as a single 32-bit wide data bus.

In some embodiments, the first subspace 407-0 and the second subspace 407-1 may be implemented with different subsets of pseudo-channels. For example, pseudo-channel Pc0.0 may be mapped to the first subspace 407-0, and pseudo-channel Pc0.1 may be mapped to the second subspace 407-1. Additionally, or alternatively, pseudo-channel Pc1.0 may be mapped to the first subspace 407-0, and pseudo-channel Pc1.1 may be mapped to the second subspace 407-1. Thus, the pseudo-channels may be partitioned into different address subspaces. For example, in some embodiments, even pseudo-channels may be mapped into a first subspace, and odd pseudo-channels may be mapped into a second subspace.

Additionally, or alternatively, the first subspace 407-0 may be configured with interleaving enabled (e.g., across banks), whereas the second subspace 407-1 may be configured with interleaving disabled. Although such an embodiment is not limited to any specific usage, in some implementations, the first subspace 407-0 with interleaving enabled may be used for more sequential traffic streams, whereas the second subspace 407-1 with interleaving disabled may be used for less sequential traffic streams.

Depending on the implementation details, such a configuration may reduce pseudo-channel interference. For example, one type of pseudo-channel interference may result when two different types of memory traffic streams (e.g., one more sequential stream and one less sequential stream) attempt to access a pair of pseudo-channels with overlapping memory access requests (e.g., at the same time). A more sequential traffic stream (e.g., a stream with relatively high locality) may send one row command (e.g., a row activation command) to open a row buffer, then send multiple column commands to efficiently read multiple columns within the open row. Thus, a more sequential stream, which may beneficially have relatively free use of the shared C/A bus, may send relatively few row commands using the shared C/A bus.

However, a less sequential traffic stream (e.g., a stream with relatively little locality) may send a relatively large number of row commands compared to column commands because of the relative randomness of the less sequential traffic stream. That is, any specific access request may be less likely to access a row that is already open, and therefore may send a row command to open a new row that may involve precharging. Thus, if a less sequential traffic stream is mapped to the same pair of pseudo-channels as the more sequential stream, it may result in a relatively large amount of C/A bus contention because the less sequential traffic stream may send a relatively large number of row commands using the shared C/A bus.

A pseudo-channel partitioning scheme in accordance with the disclosure, however, may reduce this type of pseudo-channel interference (e.g., C/A bus contention). Specifically, mapping the more sequential traffic stream to a subspace that is interleaved across multiple pseudo-channels (e.g., interleaved across multiple even pseudo-channels) may reduce interference with a less sequential traffic stream that may be mapped to a different subspace (e.g., odd pseudo-channels without interleaving). Depending on the implementation details, mapping the more sequential traffic stream to a subspace that is interleaved across multiple pseudo-channels may enable the more sequential traffic stream to send multiple column commands per row command with little or no interference (e.g., little or no C/A bus contention with a less sequential traffic stream that may be mapped to one or more pseudo-channels that may share one or more C/A buses with the pseudo-channels to which the more sequential traffic stream may be mapped).

Another type of interference may occur when two different traffic streams contend for different rows in the same bank of memory (e.g., attempt to activate two different rows in the same bank). For example, a less sequential memory traffic stream may be mapped not only to the same pair of pseudo-channels but to the same pseudo-channel as a more sequential traffic stream or another less sequential traffic stream. Depending on the implementation details, a pseudo-channel partitioning scheme in accordance with the disclosure may reduce this type of interference (e.g., bank contention), for example, by reducing or preventing overlapping attempts to access different rows in the same memory bank.

Figure 5:
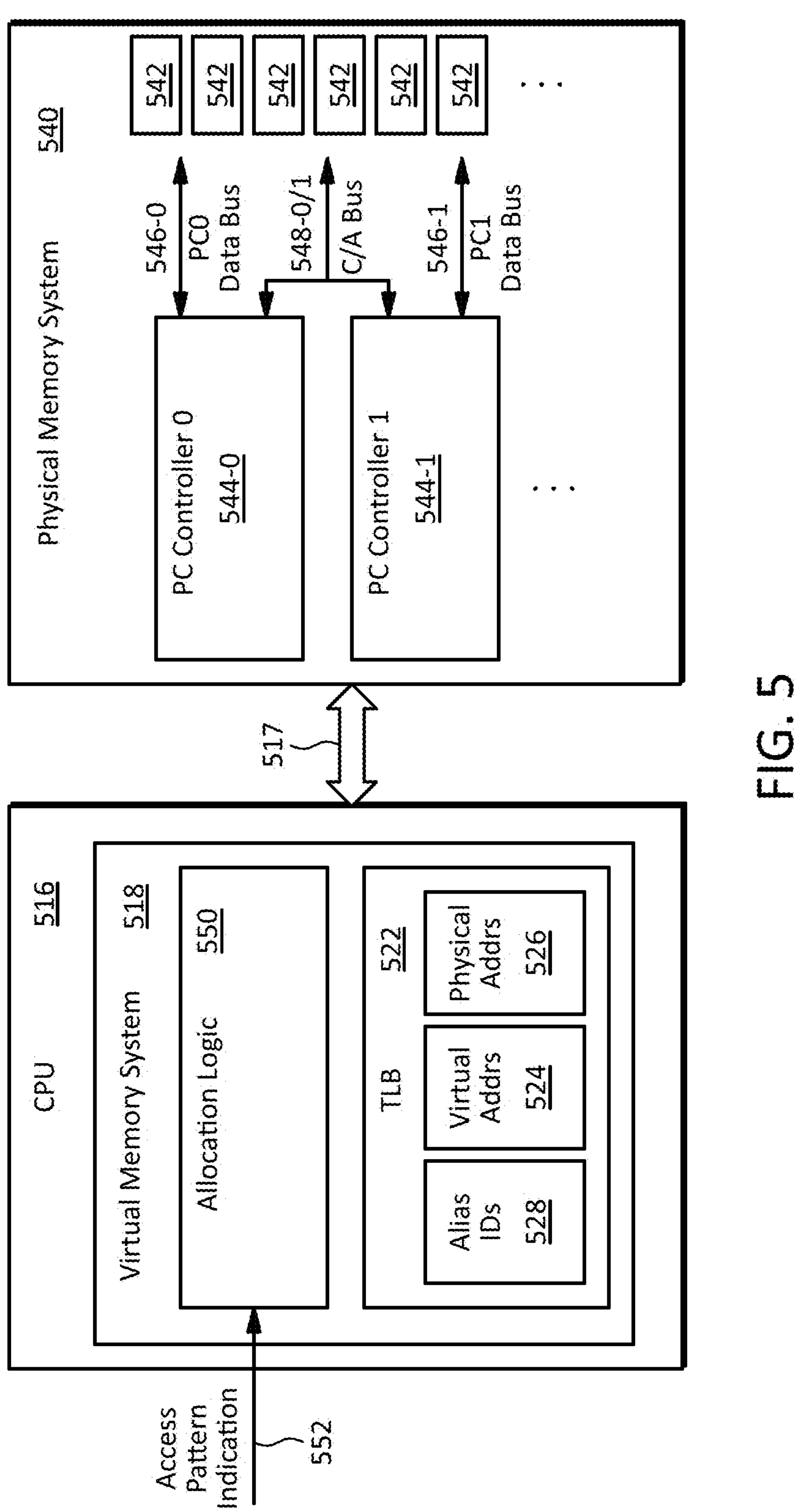
FIG. 5 illustrates an embodiment of a memory system having address subspaces in accordance with the disclosure.

FIG. 5 illustrates an embodiment of a memory system having address subspaces in accordance with the disclosure. The system illustrated in FIG. 5 may be used, for example, to implement the memory addressing scheme illustrated in FIG. 4. The system illustrated in FIG. 5 may include one or more elements that may be similar to those illustrated in other figures in which similar elements may be indicated by reference numbers ending in, and/or containing, the same digits, letters, and/or the like.

Referring to FIG. 5, the system may include a CPU 516 that may implement a virtual memory system 518 to allocate memory pages from a physical memory system 540. The virtual memory system 518 may include a translation lookaside buffer (TLB) 522 that may map virtual addresses 524 to physical addresses 526. The physical memory system 540 may include memory devices 542, a first pseudo-channel controller 544-0, and a second pseudo-channel controller 544-1 (which may also be referred to as PC Controller 0 and PC Controller 1, respectively). The memory devices 542 and pseudo-channel controllers 544-0 and 544-1 may be configured to implement one or more operating modes, at least one of which may be a pseudo-channel mode in which a first pseudo-channel may use a first data bus 546-0, a second pseudo-channel may use a second data bus 546-1, and both pseudo-channels may share a command and/or address bus 548-0/1. Some embodiments may include one or more additional pseudo-channel controllers that may implement one or more additional pseudo-channels using the memory devices 542 as indicated by the ellipses.

The virtual memory system 518 and physical memory system 540 may be connected using one or more connections 517 that may implement any type of memory interface, protocol, and/or the like, as described above with respect to FIG. 3.

In embodiments in which the system illustrated in FIG. 5 is used to implement the memory addressing scheme illustrated in FIG. 4, the physical addresses 526 may refer to physical addresses in the physical address space 407, and the physical memory system 528 may be used to implement the memory device address space 406.

Although the memory devices 542 illustrated in FIG. 5 are not limited to any specific types of devices, in some embodiments, the memory devices 542 may be implemented with HBM devices that may have at least one operating mode that may implement at least two pseudo-channels in which a first pseudo-channel may use the first data bus 546-0, a second pseudo-channel may use the second data bus 546-1, and both pseudo-channels may share the command and/or address bus 548. Additionally, or alternatively, one or more of the memory devices 542 may be implemented with two groups of memory devices (e.g., DDR devices) that may be arranged with interface circuitry that may implement a pseudo-channel interface in which one group of memory devices 542 may use the first data bus 546-0, a second group of the memory devices 542 may use the second data bus 546-1, and both groups of the memory devices 542 may share the command and/or address bus 548.

Although the pseudo-channel controllers 544-0 and 544-1 (which may be referred to collectively and/or individually as 544) may be illustrated as separate components, in some embodiments, the pseudo-channel controllers 544 may be implemented as part of a single channel controller, for example, as part of a memory controller that may be integrated with the CPU 516.

The virtual memory system 518 may include allocation logic 550 that may be configured to allocate memory (e.g., one or more memory pages) to one or more users using a memory addressing scheme having one or more address subspaces in accordance with the disclosure. For example, the allocation logic 550 may allocate memory in a manner that may implement first and second subspaces that may be similar to the first subspace 407-0 and second subspace 407-1 illustrated in FIG. 4. The first subspace may be mapped to the pseudo-channel implemented with the first pseudo-channel controller 544-0, and the second subspace may be mapped to the pseudo-channel implemented with the second pseudo-channel controller 544-1. In some embodiments, either or both of the first or second subspaces may be mapped to one or more additional pseudo-channels that may be implemented, for example, with one or more additional pseudo-channel controllers 544 as indicated by the ellipses. For example, the first subspace may be mapped to one or more even pseudo-channels, and the second subspace may be mapped to one or more odd pseudo-channels.

In some embodiments, an amount of memory allocated in response to a memory allocation request may be referred to as a memory allocation. Although memory allocations in accordance with the disclosure are not limited to any specific amounts of memory, in some embodiments, a memory allocation may be allocated in units of one or more pages of memory.

In some embodiments, memory allocated from the address subspaces implemented by the allocation logic 550 and/or virtual memory system 518 may be selected based on one or more memory traffic access patterns. For example, the allocation logic 550 may allocate memory for traffic streams having relatively more sequential access patterns from the first subspace including memory devices 542 controlled by the first pseudo-channel controller 544-0 (and/or one or more additional even pseudo-channel controllers). Additionally or alternatively, the allocation logic 550 may allocate memory for traffic streams having relatively less sequential access patterns from the second subspace including memory devices 542 controlled by the second pseudo-channel controller 544-1 (and/or one or more additional odd pseudo-channel controllers). In some embodiments, the first subspace may be configured with interleaving enabled (e.g., across banks), whereas the second subspace may be configured with interleaving disabled.

In some embodiments, the allocation logic 550 may determine which subspace to use for a specific memory allocation request (e.g., which pseudo-channel from which to allocate memory) based, at least in part, on an access pattern indicator 552. For example, a user such as an application, service, process, operating system, compiler, runtime environment, interpreter, and/or the like, may provide the access pattern indicator 552 (e.g., by setting or clearing a flag), along with an allocation request, to indicate that the requested memory is likely to be accessed more sequentially or less sequentially. The allocation logic 550 may then use the access pattern indicator 552 to allocate the requested memory from a specific subspace. For example, if a user submits an allocation request to the virtual memory system 518 along with an access pattern indicator 552 indicating the allocated memory may be accessed sequentially, the allocation logic 550 may select the allocated memory from a memory subspace implemented with one or more pseudo-channels with interleaving enabled.

Additionally or alternatively, the access pattern indicator 552 may be generated based on one or more observations of access patterns. For example, in some embodiments, monitoring logic within, or external to, the allocation logic 550 may observe an access pattern for memory allocated to a specific user and generate the access pattern indicator 552 which may be used by the allocation logic 550 to determine which subspace to use for additional memory allocation requests from the specific user. For instance, if the monitoring logic observes that a specific application tends to perform more sequential memory accesses, the monitoring logic may provide the access pattern indicator 552 in the form of a sequential access flag and application identifier to the allocation logic 550 which may use this information to allocate additional memory to the specific application from a memory subspace mapped to pseudo-channels with interleaving enabled.

Figure 6:
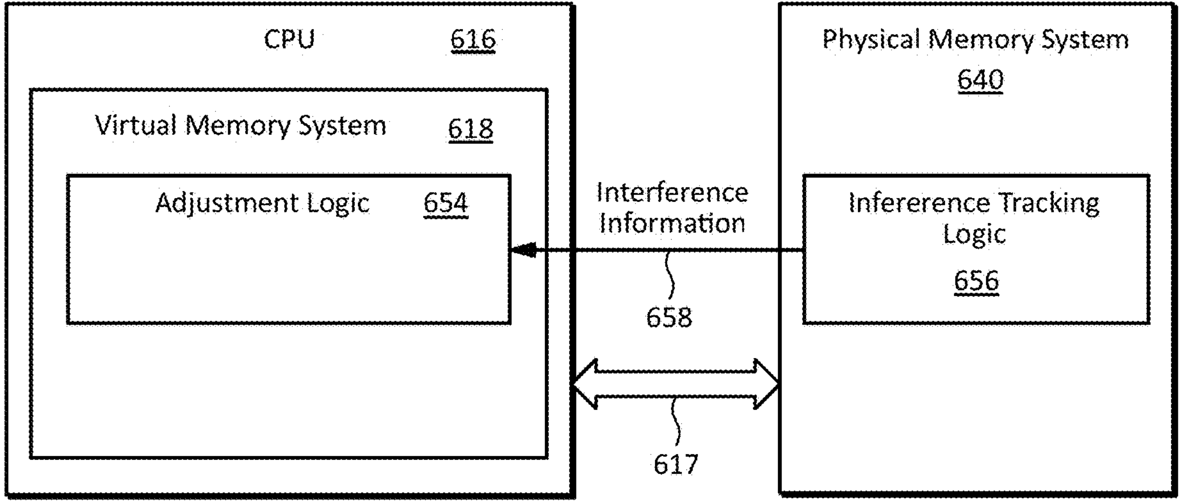
FIG. 6 illustrates an embodiment of a memory system with interference tracking in accordance with the disclosure.

FIG. 6 illustrates an embodiment of a memory system with interference tracking in accordance with the disclosure. The system illustrated in FIG. 6 may include a CPU 616 and a physical memory system 640. Although not limited to any specific type of memory architecture, in some embodiments, the physical memory system 640 may include an arrangement of memory devices that may be configured to be accessed using two or more pseudo-channels that may be similar, for example, to the pseudo-channels illustrated in FIG. 5. The system illustrated in FIG. 6 may include one or more elements that may be similar to those illustrated in other figures in which similar elements may be indicated by reference numbers ending in, and/or containing, the same digits, letters, and/or the like.

Referring to FIG. 6, the physical memory system 640 may include interference tracking logic 656 that may track one or more types of interference caused by memory accesses in the physical memory system 640. For example, the interference tracking logic 656 may monitor memory accesses and record instances of pseudo-channel interference (e.g., C/A bus contention by two different traffic streams), bank interference (e.g., two different traffic streams attempting to activate different rows in the same bank), and/or the like. The interference tracking logic 656 may send interference information 658 (e.g., information about instances of pseudo-channel interference, bank interference, and/or the like) to the CPU 616. The interference information 658 may be in any form such as a count of interference events (e.g., bus conflicts, bank interference, and/or the like), an average number of interference events over one or more periods of time, and/or the like. The interference information 658 may be provided to the CPU 616 proactively by the interference tracking logic 656, for example, periodically and/or each time an interference event occurs. Additionally or alternatively, the interference tracking logic 656 may provide interference information 658 to the CPU 616 in response to queries by the CPU 616. The interference information 658 may be tracked on any basis such as per pseudo-channel, per channel, per bank, per memory device, and/or the like.

The CPU 616 may implement a virtual memory system 618 including adjustment logic 654 that may adjust a memory allocation scheme, interleaving scheme, and/or the like, based on the interference information 658 from the interference tracking logic 656. For example, the interference tracking logic 656 may track pseudo-channel contention in a portion of an address space (e.g., a group of pseudo-channels with interleaving initially disabled) from which pages may be allocated for less sequential traffic streams. If the interference information 658 from the interference tracking logic 656 indicates that the pseudo-channel contention exceeds a threshold, the adjustment logic 654 may enable interleaving in the group of pseudo-channels. Additionally, or alternatively, if the pseudo-channel contention exceeds a threshold, the adjustment logic 654 may cause the virtual memory system 618 to allocate pages for less sequential traffic streams from a different channel.

The virtual memory system 618 and physical memory system 640 may be connected using one or more connections 617 that may implement any type of memory interface, protocol, and/or the like, as described above with respect to FIG. 3.

Figure 7:
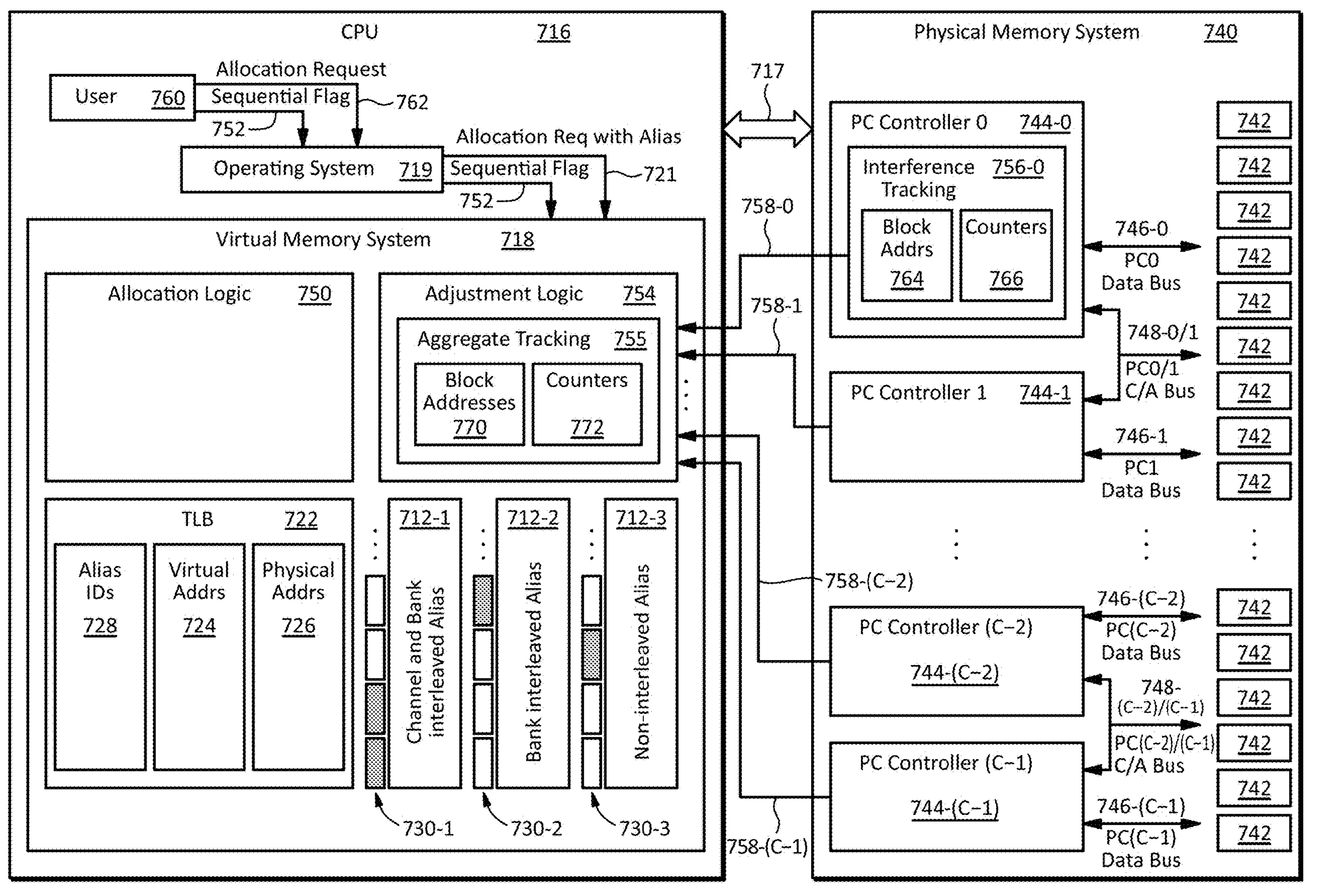
FIG. 7 illustrates an embodiment of a memory system with address subspaces and interference tracking in accordance with the disclosure.

FIG. 7 illustrates an embodiment of a memory system with address subspaces and interference tracking in accordance with the disclosure. The system illustrated in FIG. 6 may be used, for example, to implement one or more aspects of the memory addressing scheme illustrated in FIG. 4, the memory system with address subspaces illustrated in FIG. 5, and/or the memory system with interference tracking illustrated in FIG. 6. The system illustrated in FIG. 7 may include one or more elements that may be similar to those illustrated in other figures in which similar elements may be indicated by reference numbers ending in, and/or containing, the same digits, letters, and/or the like.

Referring to FIG. 7, a CPU 716 may implement a virtual memory system 718 that may allocate memory pages from a physical memory system 740. The virtual memory system 718 may include a TLB 722 that may map virtual addresses 724 to physical addresses 726 using alias identifiers 728 to implement aliases 712-1 with both channel and bank interleaving enabled, aliases 712-2 with bank interleaving enabled but channels partitioned, and/or aliases 712-3 interleaving disabled (e.g., banks and channels partitioned). In some embodiments, to ensure that only one alias is allowed to use each block of physical memory, the virtual memory system 718 may maintain maps 730-1, 730-2, and 730-3 of blocks corresponding to the aliases 712-1, 712-2, and 712-3 and only enable a block of memory (indicated by shading) to be online with only one alias.

The virtual memory system 718 and physical memory system 740 may be connected using one or more connections 717 that may implement any type of memory interface, protocol, and/or the like, as described above with respect to FIG. 3.

The physical memory system 740 may include memory devices 742 and one or more pseudo-channel controllers 744 that may be arranged in pairs to implement pairs of pseudo channels. For example, each of the even pseudo-channel controllers 744-0, 744-2, . . . , 744-(C−2) (which may also be referred to as PC Controller 0, PC Controller 2, . . . , PC Controller C−2) may be arranged in pairs with corresponding odd pseudo-channel controllers 744-0, 744-2, . . . , 744-(C−1) (which may also be referred to as PC Controller 1, PC Controller 3, . . . , PC Controller C−1) where C may indicate a total number of pseudo-channels.

In some embodiments, pairs of pseudo-channel controllers 744 may access the memory devices 742 using separate data buses 746 but shared C/A buses 748. For example, each of the even pseudo-channel controllers 744-0, 744-2, . . . , 744-(C−2) may use even data buses 746-0, 746-2, . . . , 746-(C−2), and each of the odd pseudo-channel controllers 744-0, 744-2, . . . , 744-(C−1) may use odd data buses 746-1, 746-3, . . . , 746-(C−1). However, the first pair of pseudo-channel controllers 744-0 and 744-1 may share a first C/A bus 748-0/1, the second pair of pseudo-channel controllers 744-0 and 744-1 may share second a C/A bus 748-2/3, and so on until the last pair of pseudo-channel controllers 744-(C−2) and 744-(C−1) may share the final C/A bus 748-(C−2)/(C−1).

Although the memory devices 742 are not limited to any specific types of devices, in some embodiments, one or more of the memory devices 742 may be implemented with HBM devices that may have at least one operating mode that may implement at least two pseudo-channels in which a first pseudo-channel may use a first data bus (e.g., 746-0), a second pseudo-channel may use a second data bus (e.g., 746-1), and both pseudo-channels of an HBM device may share a command and/or address bus (e.g., 748-0/1). Additionally, or alternatively, one or more of the memory devices 742 may be implemented with two groups of memory devices (e.g., DDR devices) that may be arranged with interface circuitry that may implement a pseudo-channel interface in which one group of memory devices 742 may use a first data bus (e.g., 746-0), a second group of the memory devices 742 may use a second data bus (e.g., 746-1), and both groups of the memory devices 742 may share a C/A bus (e.g., 748-0/1).

The CPU 716 may run an operating system 719. A user 760 (e.g., an application, service, process, compiler (e.g., just-in-time compiler), runtime environment, interpreter, and/or the like) may send a memory allocation request 762, to the operating system 719. In some embodiments, the user 760 may send an access pattern indication 752 to the operating system 719 to indicate an expected access pattern for the requested memory. Additionally or alternatively, the access pattern indication 752 may be provided to the operating system 719 by monitoring logic that may observe an access pattern for memory allocated to the user 760 and generate the access pattern indicator 752 based on the observed access pattern.

In response to receiving the memory allocation request 762 from the user 760, the operating system 719 may generate a memory allocation request 721 including one or more partitioning and/or interleaving alias selections which the operating system 719 may send to the virtual memory system 718. In some embodiments, the operating system 719 may also forward the access pattern indication 752 to the virtual memory system 718 along with the corresponding memory allocation request 721. In some embodiments, the operating system 719 may select the partitioning or interleaving aliases at run-time, for example, in response to the access pattern indication 752, interference information as described below, and/or other information.

In some embodiments, the virtual memory system 718 may include allocation logic 750 that may be configured to allocate memory (e.g., one or more memory pages) to one or more users using a memory addressing scheme having one or more address subspaces in accordance with the disclosure. For example, the allocation logic 750 may allocate memory in a manner that may implement first and second subspaces that may be similar to the first subspace 407-0 and second subspace 407-1 illustrated in FIG. 4. The first subspace may be mapped to pseudo-channels implemented with the even pseudo-channel controllers 744-0, 744-2, . . . , 744-(C−2), and the second subspace may be mapped to pseudo-channels implemented with the odd pseudo-channel controllers 744-1, 744-3, . . . , 744-(C−1).

In some embodiments, the allocation logic 750 may determine which subspace to use for a specific memory allocation request (e.g., which pseudo-channel from which to allocate memory) based, at least in part, on the access pattern indicator 752. For example, the user 760 may provide the access pattern indicator 752 (e.g., by setting or clearing a flag), along with a corresponding allocation request 762, to the operating system 719 to indicate that the requested memory is likely to be accessed more sequentially or less sequentially. The operating system 719 may use the allocation request 762 from the user 760 to generate a memory allocation request 721 including one or more alias selections which the operating system 719 may send to the virtual memory system 718. The operating system 719 may also forward the access pattern indication 752 to the virtual memory system 718 along with the corresponding memory allocation request 721.

The allocation logic 750 may then use the access pattern indicator 752 to allocate the requested memory from a specific subspace. For example, if the memory allocation request 721 is accompanied by an access pattern indicator 752 indicating the allocated memory may be accessed sequentially, the allocation logic 750 may select the allocated memory from a memory subspace implemented with one or more even pseudo-channels from mapping alias 712-1 (both channel and bank interleaving enabled) or 712-2 (bank interleaving enabled but channels partitioned). In some embodiments, the choice between mapping alias 712-1 and mapping alias 712-2 may be made by the operating system 719. In other embodiments, the choice between mapping alias 712-1 and mapping alias 712-2 may be made by the allocation logic 750. In some embodiments, the partitioning or interleaving scheme may be selected at run-time (e.g., by an operating system), and/or the virtual memory system 718 and/or the physical memory system 740 may ensure that only one alias is allowed to use each block of physical memory.

Figure 8:
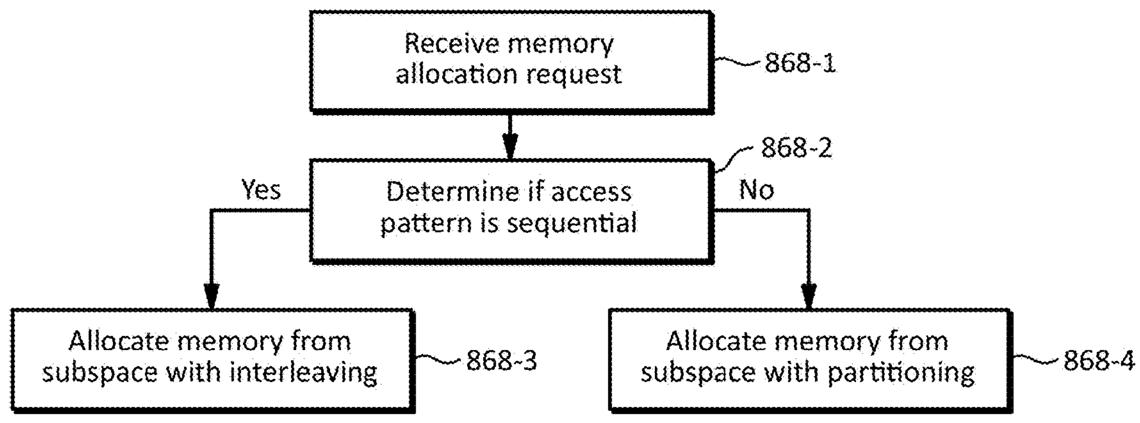
FIG. 8 illustrates an example embodiment of a method for allocating memory in accordance with the disclosure.

FIG. 8 illustrates an example embodiment of a method for allocating memory in accordance with the disclosure. The embodiment illustrated in FIG. 8 may be used, for example, to implement the allocation logic 750 illustrated in FIG. 7.

Referring to FIG. 8, the method may begin at operation 868-1 in which the method may receive (e.g., at allocation logic 750) a request for memory allocation (e.g., a memory allocation request 721). At operation 868-2, the method may check an access pattern indication (e.g., access pattern indication 752) to determine an access pattern that may be likely, expected, planned, and/or the like, for the requested memory. If an access pattern for the requested memory is sequential, the method may proceed to operation 868-3 at which the method may allocate a memory allocation (e.g., one or more pages of memory) from a memory subspace implemented with one or more pseudo-channels with interleaving enabled (e.g., by one or more of the even pseudo-channel controllers 744-0, 744-2, . . . , 744-(C−2). For example, the requested memory may be allocated using one or more even pseudo-channels from mapping alias 712-1 (both channel and bank interleaving enabled) or 712-2 (bank interleaving enabled but channels partitioned).

However, if at operation 868-2, the method determines that an access pattern for the requested memory is non-sequential, the method may proceed to operation 868-4 at which the method may allocate a memory allocation (e.g., one or more pages of memory) from a memory subspace implemented with one or more pseudo-channels with partitioning (e.g., with interleaving disabled) such as with one or more of the odd pseudo-channel controllers 744-1, 744-3, . . . , 744-(C−1). For example, the requested memory may be allocated using one or more even pseudo-channels from 712-3 (both channel and bank interleaving disabled).

Referring to FIG. 7, in some embodiments, one or more of the pseudo-channel controllers 744 may include interference tracking logic 756-0, 756-1, . . . , 756-(C−1) to track pseudo-channel interference. An instance of interference tracking logic 756 (e.g., 756-0 in pseudo-channel controller 744-0) may include a data structure 764 that may maintain a list of addresses of memory blocks that have experienced a C/A bus contention event (e.g., on the C/A bus 748-0/1) and one or more counters 766 that may maintain a count of C/A bus contention events for corresponding memory block addresses.

The interference tracking logic 756 may send interference information 758-0, 758-1, . . . , 758-(C−1) (e.g., a list of one or more memory block addresses and one or more counts of C/A bus contention events corresponding to the memory block addresses) to adjustment logic 754 at the virtual memory system 718. In some embodiments, the adjustment logic 754 may include aggregate interference tracking logic 755 that may aggregate (e.g., combine, add, and/or the like) interference information 758, for example, by adding counts of C/A bus contention events for memory block addresses from the individual instances of interference tracking logic 756-0, 756-1, . . . , 756-(C−1). The aggregate interference tracking logic 755 may include a data structure 770 that may maintain an aggregate list of memory block addresses that have experienced a C/A bus contention event (e.g., on the C/A buses 748) and one or more counters 772 that may maintain one or more aggregate counts of C/A bus contention events for corresponding memory block addresses.

The interference information 758 may be transmitted to the virtual memory system 718 using any suitable technique. For example, some embodiments may use one or more registers such as registers that may be used to configure the pseudo-channel controllers 744, memory devices 742, and/or the like, but any other communication path from the pseudo-channel controllers 744 to the virtual memory system 718 may be used.

In some embodiments, the adjustment logic 754 may adjust a memory allocation scheme, interleaving scheme, and/or the like, based on the aggregate list of memory block addresses and/or aggregate counts of C/A bus contention events for corresponding memory block addresses. For example, the interference tracking logic 756 and/or aggregate interference tracking logic 755 may track pseudo-channel contention in a portion of an address space (e.g., a group of pseudo-channels with interleaving initially disabled) from which pages may be allocated for less sequential traffic streams. If one or more aggregate counts of C/A bus contention events indicate that the pseudo-channel contention exceeds a threshold, the adjustment logic 754 may enable interleaving in the group of pseudo-channels. Additionally, or alternatively, if the pseudo-channel contention exceeds a threshold, the adjustment logic 754 may cause the virtual memory system 718 to allocate pages for less sequential traffic streams from a different channel.

In some example embodiments, the allocation logic 750 and adjustment logic 754 may operate in a cooperative manner to implement a memory allocation scheme with combined address subspaces and interference tracking in accordance with the disclosure. For example, in some embodiments, the allocation logic 750 may implement a first feature with coarse-grained pseudo-channel partitioning scheme based on an access pattern indication 752 that may be implemented with a sequential access flag.

In such an embodiment, the user 760 (e.g., higher-level software such as an application, compiler, runtime, and/or the like) may send a memory access request 762 and provide a sequential access flag to the operating system which may generate an allocation request 721 (e.g., with an alias selection) and pass the flag to the virtual memory system 718 to indicate whether memory allocated based on the request 721 will likely be accessed sequentially or non-sequentially. Allocations indicated as sequential are likely to be accessed sequentially by the sequential access flag and may be taken from even pseudo-channels with interleaving enabled across some or all even pseudo-channels (e.g., pseudo-channels implemented by even pseudo-channel controllers 744-0, 744-2, . . . , 744-(C−2)), whereas allocations indicated as non-sequential are likely to be accessed non-sequentially by the sequential access flag and may be taken from odd pseudo-channels (e.g., pseudo-channels implemented by odd pseudo-channel controllers 744-1, 744-3, . . . , 744-(C−1)).

Depending on the implementation details, this system of sharing may tend to reduce C/A bus conflicts and/or improve performance. For example, by steering sequential and non-sequential allocations to different subsets of pseudo-channels, traffic streams that tend to have a large number of row commands (e.g., non-sequential accesses) may tend to share a C/A bus with traffic streams that tend to have a smaller number of row commands (e.g., sequential accesses).

Moreover, in such an embodiment, the adjustment logic 754, in combination with the allocation logic 750 may implement a second feature with adaptive allocations based on pseudo-channel interference tracking. For example, in some situations, non-sequential allocations allocated from odd pseudo-channels with interleaving disabled may eventually incidentally map to the same pseudo-channel (e.g., during times when other pseudo-channels are not active). In one example of such a situation, a workload may initially begin with six memory traffic streams in which two streams may be assigned to a first pseudo-channel and four streams may be assigned to four other available pseudo-channels and thus, there may be little or no interference across the workload which may be spread across several pseudo-channels. However, the workload may change in such a manner that the four streams that were assigned to four other pseudo-channels may become idle (e.g., may complete), and thus, the workload may be concentrated in two memory traffic streams that may be assigned to one pseudo-channel while the four other available pseudo-channels are not active, thereby resulting in a relatively large amount of pseudo-channel interference on the first pseudo-channel.

Depending on the implementation details, the adjustment logic 754 may help avoid this type of interference situation. For example, in some embodiments, the interference tracking logic 756 in one or more of the pseudo-channel controllers 744 may include a counter for each active block that increments each time a command to an address within that block experiences a C/A bus conflict. The virtual memory system 718 may periodically query the interference tracking logic 756 in the pseudo-channel controllers 744 controllers to obtain the values of the counters and store them in the aggregate interference tracking logic 755 (e.g., in the data structure 770 and/or counters 772). When assigning allocations to aliases, the virtual memory system 718 may check the aggregate interference tracking logic 755. If an attempt is made to allocate a page in a non-sequential portion of the address subspace (e.g., a subspace implemented with odd pseudo-channel controllers 744-1, 744-3, . . . , 744-(C−1)) within a block having a corresponding counter that has reached a threshold that has channel interleaving disabled, the allocation logic 750 and/or adjustment logic 754 within the virtual memory system 718 may allocate the page instead from within a block with channel interleaving enabled. Alternatively or additionally, the allocation logic 750 and/or adjustment logic 754 within the virtual memory system 718 may allocate the page within a region assigned to a different channel.

In some embodiments, one or more thresholds for interference tracking (e.g., one or more counter thresholds) may be configurable, for example, by an application, service, process, operating system, compiler, runtime environment, interpreter, system administrator, vendor, and/or the like. Additionally or alternatively, one or more elements of the tracking logic 756 and/or 755 (e.g., one or more counters) may be reset, for example, periodically and/or at one or more intervals that may be configured by an application, service, process, operating system, compiler, runtime environment, interpreter, system administrator, vendor, and/or the like.

In some embodiments, and depending on the implementation details, the second feature with adaptive allocations based on pseudo-channel interference tracking may essentially cause the virtual memory system 718 to use an at least partial interleaving memory allocation scheme, even if the first feature with pseudo-channel partitioning based on the access pattern indication 752 would otherwise allocate memory using a partitioned scheme (or at least assign a memory allocation to a different block within the partitioned even pseudo-channels). In some embodiments, the second feature with adaptive allocations based on pseudo-channel interference tracking may essentially override the first feature with pseudo-channel partitioning based on the access pattern indication 752, for example, by overriding the sequential access flag if the amount of contention exceeds another threshold.

Although the allocation logic 750 and/or adjustment logic 754 may be illustrated as separate components, in some embodiments, some or all of the allocation logic 750 and/or adjustment logic 754 may be implemented as an integral component, as part of the operating system 719 and/or as part of any other components.

Figure 9:
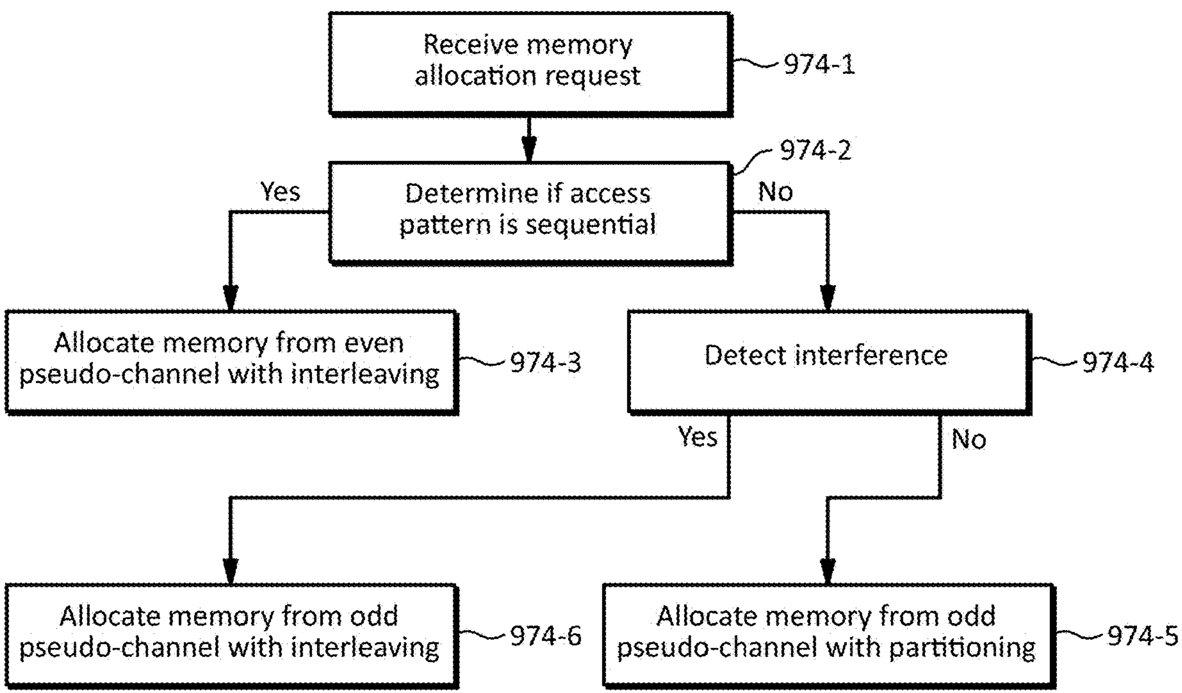
FIG. 9 illustrates an example embodiment of a method for allocating memory with address subspaces and interference tracking in accordance with the disclosure.

FIG. 9 illustrates an example embodiment of a method for allocating memory with address subspaces and interference tracking in accordance with the disclosure. The embodiment illustrated in FIG. 9 may be used, for example, to implement the allocation logic 750 and/or adjustment logic 754 illustrated in FIG. 7.

Referring to FIG. 9, the method may begin at operation 974-1 in which the method may receive (e.g., at allocation logic 750) a request for memory allocation (e.g., a memory allocation request 721). At operation 974-2, the method may check an access pattern indicator (e.g., access pattern indicator 752) to determine an access pattern that may be likely, expected, planned, and/or the like, for the requested memory. If an access pattern for the requested memory is sequential, the method may proceed to operation 974-3 at which the method may allocate a memory allocation (e.g., one or more pages of memory) from a memory subspace implemented with one or more pseudo-channels with interleaving enabled (e.g., by one or more of the even pseudo-channel controllers 744-0, 744-2, . . . , 744-(C−2). For example, the requested memory may be allocated using one or more even pseudo-channels from mapping alias 712-1 (both channel and bank interleaving enabled) or 712-2 (bank interleaving enabled but channels partitioned).

However, if at operation 974-2, the method determines that an access pattern for the requested memory is non-sequential, the method may proceed to operation 974-4 at which the method may determine whether interference has been detected (e.g., if a count of contention events for a block of memory associated with the allocation request has reached a threshold). If interference is not detected (e.g., the count has not reached the threshold), the method may proceed to operation 974-5 at which the method may allocate a memory allocation (e.g., one or more pages of memory) from a memory subspace implemented with one or more pseudo-channels with partitioning (e.g., with interleaving disabled such as by using one or more of the odd pseudo-channel controllers 744-1, 744-3, . . . , 744-(C−1)). For example, the requested memory may be allocated using one or more even pseudo-channels from mapping alias 712-3 (both channel and bank interleaving disabled).

If, however, at operation 974-4, interference has been detected (e.g., the count has reached the threshold), the method may proceed to operation 974-6 at which the method may allocate a memory allocation from a memory subspace implemented with one or more pseudo-channels with interleaving enabled (e.g., by one or more of the odd pseudo-channel controllers 744-1, 744-3, . . . , 744-(C−1). For example, the requested memory may be allocated using one or more odd pseudo-channels from mapping alias 712-1 (both channel and bank interleaving enabled) or 712-2 (bank interleaving enabled but channels partitioned).

Figure 10:
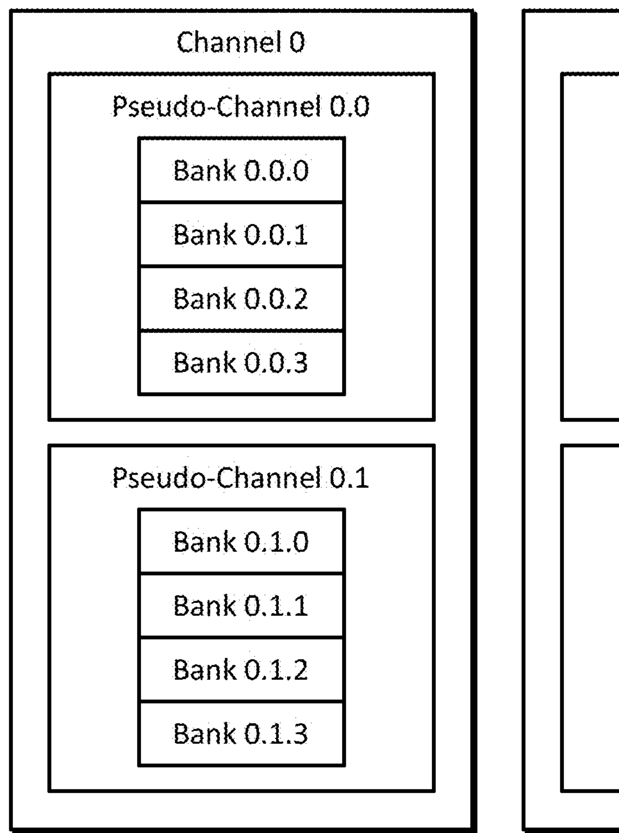
FIG. 10 illustrates an embodiment of a memory configuration in accordance with the disclosure.
Figure 10:
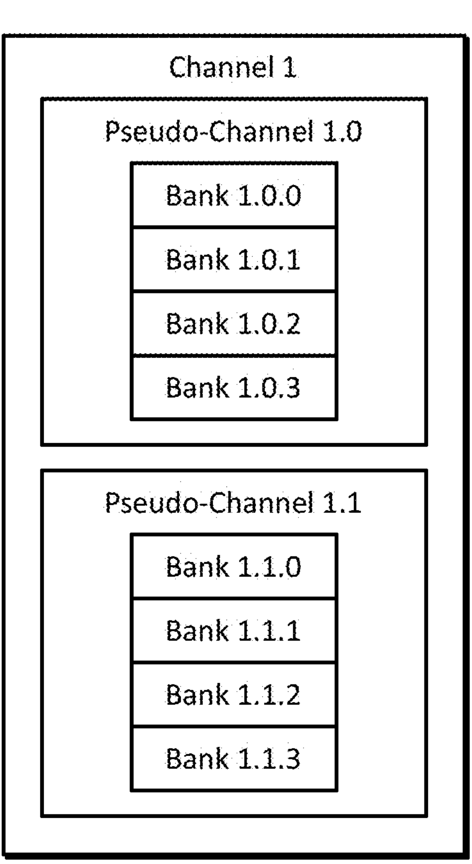

FIG. 10 illustrates an embodiment of a memory configuration in accordance with the disclosure. The embodiment illustrated in FIG. 10 may be used, for example, to implement any of the virtual memory systems, physical memory systems, and/or the like, referenced herein.

In the embodiment illustrated in FIG. 10, banks of memory devices may be arranged in two channels which may also be referred to as Channel 0 and Channel 1.

The banks of memory devices in Channel 0 may be arranged in two pseudo-channels which may be referred to as Pseudo-channel 0.0 and Pseudo-channel 0.1.

The banks of memory devices in Channel 1 may be arranged in two pseudo-channels which may be referred to as Pseudo-channel 1.0 and Pseudo-channel 1.1.

The banks of memory devices within Pseudo-channel 0.0 may be indicated as Bank 0.0.0, Bank 0.0.1, Bank 0.0.2, and Bank 0.0.3.

The banks of memory devices within Pseudo-channel 0.1 may be indicated as Bank 0.1.0, Bank 0.1.1, Bank 0.1.2, and Bank 0.1.3.

The banks of memory devices within Pseudo-channel 1.0 may be indicated as Bank 1.0.0. Bank 1.0.1, Bank 1.0.2, and Bank 1.0.3.

The banks of memory devices within Pseudo-channel 1.1 may be indicated as Bank 1.1.0, Bank 1.1.1, Bank 1.1.2, and Bank 1.1.3.

For purposes of illustration, the embodiment illustrated in FIG. 10 includes two channels, each of which includes two pseudo-channels, each of which includes four banks. In other embodiments, however, any number of channels, pseudo-channels, banks, and/or the like, may be used.

FIG. 11 illustrates an embodiment of a partitioned memory allocation sequence in accordance with the disclosure. For purposes of illustration, the embodiment illustrated in FIG. 11 is described in the context of using the memory configuration illustrated in FIG. 10, but other memory configurations may be used. For example, the virtual memory system 718 illustrated in FIG. 7 may use the embodiment illustrated in FIG. 11 to allocate memory from the physical memory system 740 illustrated in FIG. 7 in response to memory requests 721 if memory devices in the physical memory system 740 are arranged at least partially as illustrated in FIG. 10.

The embodiment illustrated in FIG. 11 may be used, for example, to implement a partitioned (e.g. non-interleaved) memory allocation scheme such as the mapping alias 712-3 illustrated in FIG. 7. Depending on the implementation details, the embodiment illustrated in FIG. 11 may be used to implement a memory subspace implemented with pseudo-channel interleaving disabled, for example, as in operation 868-4 illustrated in FIG. 8.

Referring to FIG. 11, allocations may proceed as shown in response to memory allocation requests indicated as Request 0, Request 1, . . . , Request 15.

In response to Request 0, Request 1, Request 2, and Request 3, memory may be allocated from Bank 0.0.0.

In response to Request 4, Request 5, Request 6, and Request 7, memory may be allocated from Bank 0.0.1.

In response to Request 8, Request 9, Request 10, and Request 11, memory may be allocated from Bank 0.0.2.

In response to Request 12, Request 13, Request 14, and Request 15, memory may be allocated from Bank 0.0.3.

FIG. 12 illustrates an embodiment of a memory allocation sequence with bank interleaving within a memory subspace in accordance with the disclosure. For purposes of illustration, the embodiment illustrated in FIG. 12 is described in the context of using the memory configuration illustrated in FIG. 10, but other memory configurations may be used. For example, the virtual memory system 718 illustrated in FIG. 7 may use the embodiment illustrated in FIG. 12 to allocate memory from the physical memory system 740 illustrated in FIG. 7 in response to memory requests 721 if memory devices in the physical memory system 740 are arranged at least partially as illustrated in FIG. 10.

The embodiment illustrated in FIG. 12 may be used, for example, to implement an interleaved memory allocation scheme such as the mapping alias 712-2 (bank interleaving enabled but channels partitioned) illustrated in FIG. 7. Depending on the implementation details, the embodiment illustrated in FIG. 11 may be used to implement a memory subspace with interleaving between banks enabled, for example, as in operation 868-3 illustrated in FIG. 8.

Referring to FIG. 12, allocations may proceed as shown in response to memory allocation requests indicated as Request 0, Request 1, . . . , Request 15.

In response to Request 0, Request 1, Request 2, and Request 3, memory may be allocated from Bank 0.0.0, Bank 0.0.1. Bank 0.0.2, and Bank 0.0.3, respectively.

In response to Request 4, Request 5, Request 6, and Request 7, memory may be allocated from Bank 0.0.0, Bank 0.0.1, Bank 0.0.2, and Bank 0.0.3, respectively.

In response to Request 8, Request 9, Request 10, and Request 11, memory may be allocated from Bank 0.1.0, Bank 0.1.1, Bank 0.1.2, and Bank 0.1.3, respectively.

In response to Request 12, Request 13, Request 14, and Request 15, memory may be allocated from Bank 0.1.0, Bank 0.1.1, Bank 0.1.2, and Bank 0.1.3, respectively.

FIG. 13 illustrates an embodiment of a memory allocation sequence with bank and channel interleaving within a memory subspace in accordance with the disclosure. For purposes of illustration, the embodiment illustrated in FIG. 13 is described in the context of using the memory configuration illustrated in FIG. 10, but other memory configurations may be used. For example, the virtual memory system 718 illustrated in FIG. 7 may use the embodiment illustrated in FIG. 13 to allocate memory from the physical memory system 740 illustrated in FIG. 7 in response to memory requests 721 if memory devices in the physical memory system 740 are arranged at least partially as illustrated in FIG. 10.

The embodiment illustrated in FIG. 13 may be used, for example, to implement an interleaved memory allocation scheme such as the mapping alias 712-1 (bank and channel interleaving enabled) illustrated in FIG. 7. Depending on the implementation details, the embodiment illustrated in FIG. 13 may be used to implement a memory subspace with interleaving between banks and channels enabled, for example, as in operation 868-3 illustrated in FIG. 8.

Referring to FIG. 13, allocations may proceed as shown in response to memory allocation requests indicated as Request 0, Request 1, . . . , Request 15.

In response to Request 0, Request 1, Request 2, and Request 3, memory may be allocated from Bank 0.0.0, Bank 1.0.0, Bank 0.0.1, and Bank 1.0.1, respectively.

In response to Request 4, Request 5, Request 6, and Request 7, memory may be allocated from Bank 0.0.2. Bank 1.0.2, Bank 0.0.3, and Bank 1.0.3, respectively.

In response to Request 8, Request 9, Request 10, and Request 11, memory may be allocated from Bank 0.1.0, Bank 1.1.0, Bank 0.1.1, and Bank 1.1.1, respectively.

In response to Request 12. Request 13. Request 14, and Request 15, memory may be allocated from Bank 0.1.2, Bank 1.1.2, Bank 0.1.3, and Bank 1.1.3, respectively.

FIG. 14 illustrates an embodiment of a memory allocation sequence with bank, channel, and pseudo-channel interleaving in accordance with the disclosure. For purposes of illustration, the embodiment illustrated in FIG. 14 is described in the context of using the memory configuration illustrated in FIG. 10, but other memory configurations may be used.

Referring to FIG. 14, allocations may proceed as shown in response to memory allocation requests indicated as Request 0, Request 1, . . . , Request 15.

In response to Request 0, Request 1, Request 2, and Request 3, memory may be allocated from Bank 0.0.0. Bank 0.1.0, Bank 1.0.0, and Bank 1.1.0, respectively.

In response to Request 4, Request 5, Request 6, and Request 7, memory may be allocated from Bank 0.0.1, Bank 0.1.1. Bank 1.0.1, and Bank 1.1.1, respectively.

In response to Request 8, Request 9, Request 10, and Request 11, memory may be allocated from Bank 0.0.2, Bank 0.1.2, Bank 1.0.2, and Bank 1.1.2, respectively.

In response to Request 12, Request 13, Request 14, and Request 15, memory may be allocated from Bank 0.0.3, Bank 0.1.3, Bank 1.0.3, and Bank 1.1.3, respectively.

Any of the functionality described herein, including any of the logic and/or other functionality that may be implemented as part of a virtual memory system, a physical memory system, and/or the like, may be implemented with hardware (e.g., circuitry), software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, phase change memory (PCM), and/or the like, one or more complex programmable logic devices (CPLDs), field programmable gate arrays (FPGAs), application specific integrated circuits (ASICs), processors including one or more complex instruction set computer (CISC) processors such as x86 processors and/or reduced instruction set computer (RISC) processors such as ARM processors, graphics processing units (GPUs), neural processing units (NPUs), tensor processing units (TPUs), data processing units (DPUs) and/or the like, executing instructions stored in any type of memory, or any combination thereof. In some embodiments, one or more components may be implemented as a system-on-chip (SOC).

In some embodiments, elements identified with reference numerals having extensions to base numerals (e.g., using dashes, periods, and/or the like) may be referred to collectively and/or individually by the base numeral. Thus, for example, the pseudo-channel controllers 544-0 and/or 544-1 may be referred to collectively and/or individually as 544.

Some embodiments disclosed herein have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:

allocating a first memory page from a first type of pseudo-channel based on a first access pattern for the first memory page, wherein the first type of pseudo-channel is configured for an interleaving operation and the first access pattern is sequential;

allocating a second memory page from a second type of pseudo-channel based on a second access pattern for the second memory page, wherein the second type of pseudo-channel is configured for a partitioned operation and the second access pattern is non-sequential;

monitoring an access of the second memory page;

detecting, based on the monitoring, interference associated with the second memory page; and allocating, based on the detecting, a third memory page from the first type of pseudo-channel based on a third access pattern for the third memory page, wherein the third access pattern is non-sequential.

2. The method of claim 1, wherein the first memory page is allocated based on an access pattern indication.

3. The method of claim 2, wherein:

the first memory page is allocated based on a request received from a user; and the access pattern indication is received from the user.

4. The method of claim 1, wherein:

the interference comprises command bus contention.

5. The method of claim 1, wherein:

the first type of pseudo-channel is mapped to a first portion of an address space; and the second type of pseudo-channel is mapped to a second portion of the address space.

6. The method of claim 1, wherein the interleaving operation comprises channel interleaving.

7. The method of claim 1, wherein the interleaving operation comprises bank interleaving.

8. The method of claim 1, wherein:

the first memory page is allocated from a first block of memory associated with a first channel; and the third memory page is allocated from a second block of memory associated with a second channel.

9. A memory system comprising:

a monitoring circuit configured to detect interference associated with a first memory page;

at least one processing circuit configured to:

allocate the first memory page from a first type of pseudo-channel based on a first access pattern for the first memory page, wherein the first type of pseudo-channel is configured for interleaving operation and the first access pattern is sequential;

allocate a second memory page from a second type of pseudo-channel based on a second access pattern for the second memory page, wherein the second type of pseudo-channel is configured for partitioned operation and the second access pattern is non-sequential; and allocate, based on the interference, a third memory page from the first type of pseudo-channel based on a third access pattern for the third memory page, wherein the third access pattern is non-sequential.

10. The memory system of claim 9, wherein the at least one processing circuit is configured to:

receive an access pattern indication; and allocate the first memory page based on the access pattern indication.

11. The memory system of claim 9, wherein:

the at least one processing circuit is configured to allocate the first memory page using a first memory mapping scheme; and the at least one processing circuit is configured to allocate, based on the interference, the third memory page using a second memory mapping scheme.

12. A memory system comprising:

a monitoring circuit configured to detect interference associated with a first memory page; and at least one processing circuit configured to:

allocate the first memory page from a first portion of an address space based on a first access pattern for the first memory page, wherein the first portion of the address space is configured for a first interleaving scheme;

allocate a second memory page from a second portion of the address space based on a second access pattern for the second memory page, wherein the second portion of the address space is configured for a second interleaving scheme; and configure, based on the interference, the first portion of the address space for the second interleaving scheme.

13. The memory system of claim 12, wherein:

the first access pattern comprises a sequential access pattern; and the second access pattern comprises a non-sequential access pattern.

14. The memory system of claim 12, wherein:

the first memory page is allocated from a first pseudo-channel mapped to the first portion of the address space; and the second memory page is allocated from a second pseudo-channel mapped to the second portion of the address space.

15. The memory system of claim 12, wherein the interference comprises command bus contention.

* * * * *